L. D. FREELAND.
ROLLER BEARING.
APPLICATION FILED AUG. 3, 1916.

1,251,004.

Patented Dec. 25, 1917.
2 SHEETS—SHEET 1.

Witnesses:
W. P. Kilroy
Harry R. White

Inventor,
Lloyd D. Freeland
By Edward Jay Wilson
Atty.

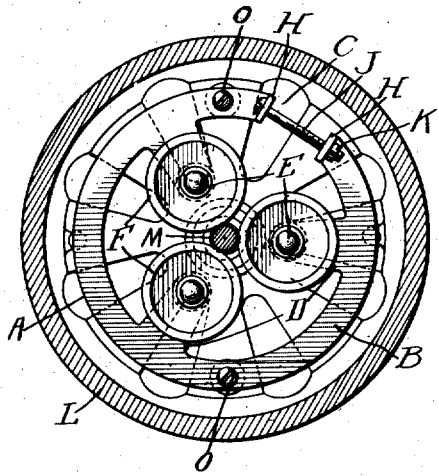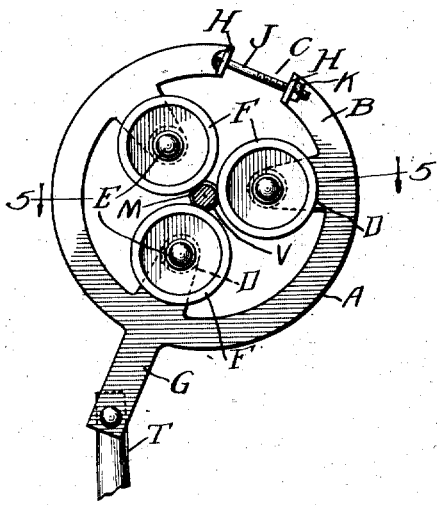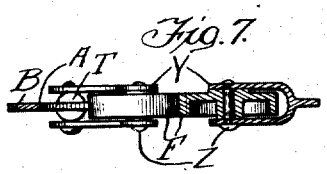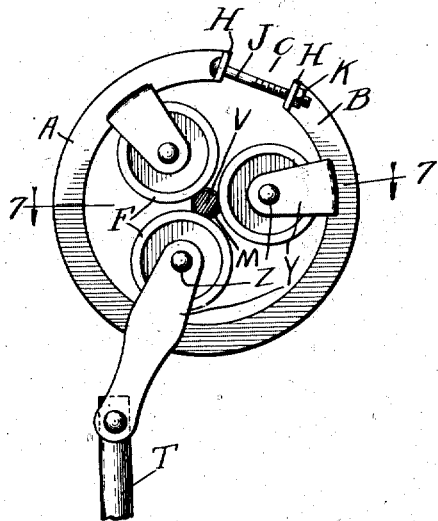

UNITED STATES PATENT OFFICE.

LLOYD D. FREELAND, OF HALBRITE, SASKATCHEWAN, CANADA, ASSIGNOR TO WILLIAM J. H. STRONG, OF CHICAGO, ILLINOIS.

ROLLER-BEARING.

1,251,004.  Specification of Letters Patent.  Patented Dec. 25, 1917.

Original application filed March 27, 1915, Serial No. 17,568. Divided and this application filed August 3, 1916. Serial No. 112,945.

*To all whom it may concern:*

Be it known that I, LLOYD D. FREELAND, citizen of the United States, residing at Halbrite, Saskatchewan, Canada, have invented certain new and useful Improvements in Roller-Bearings; and I do hereby declare the following to be a full, clear, and exact description of the invention, such as will enable others skilled in the art to which it appertains to make and use the same.

My invention relates to journal bearings and has special reference to roller bearings.

The object of my invention is to provide a roller bearing of simple construction, which can be manufactured at relatively low cost; which shall be capable of being easily adjusted to fit the journal upon which it is used; which shall be durable; which shall be adapted for use upon connecting rods as well as in stationary positions, and which can be easily and quickly installed.

A further object of my invention is to provide a roller bearing which shall be noiseless in its operation, particularly when applied to situations where the lateral thrust changes direction.

My invention consists in a roller bearing having a frame-work upon which are mounted a ring of rollers of relatively large diameter, and constituting a roller bearing adapted for use on a stationary support to form a stationary bearing, or to form the crank pin bearing on a connecting rod, or the like, the framework being resilient and split or divided at one point of its circumference, and joined by a tension member for adjusting same to fit the shaft or journal to which it is applied.

My invention also consists in the several features of construction and in the arrangements and combinations of parts by means of which I am enabled to attain the above-mentioned and other objects, and all as hereinafter described and particularly pointed out in the appended claims.

This present application is a divisional application, the subject-matter thereof having been first presented in my copending application for patent on motor driven fan, filed March 27, 1915, Ser. No. 17,568.

My invention will be more readily understood by reference to the accompanying drawings forming part of this specification, and in which:

Fig. 3 is a transverse section on the line 3—3 of Fig. 1.

Fig. 4 is a side elevation of one of my improved roller bearings as applied to a connecting rod.

Fig. 5 is a section on the line 5—5 of Fig. 4.

Fig. 6 is a view similar to Fig. 4 showing a slightly modified form of bearing.

Fig. 7 is a section on the line 7—7 of Fig. 6.

My bearing comprises a flat sheet metal frame A, preferably in the form of a ring B split at one point in its circumference, as at C. The ring carries, or is provided with, inwardly extending radial projections D which extend inwardly from the ring toward the center thereof. These projections D carry rigid bearing pins E at their inner ends upon which rollers F are rotatably mounted. The pins E are made smaller where they pass through the arms D, thus providing shoulders for properly mounting them in the arms. These rollers are relatively large in diameter in the form of my bearing which I have illustrated, this large diameter of roller being made possible by the fact that I preferably use a small total number of rollers in constructing a bearing, in the form shown three of the rollers F being used.

Preferably the split in the ring B is located midway between two of the rollers F and where the bearing is used on a connecting rod the ring is provided with an outwardly extending projection G at a diametrically opposite point to which a piston may be pivotally attached. The ends of the ring B are preferably bent at a right angle to the plane of the ring to form lugs H, and these lugs are perforated to receive an adjusting screw J for drawing the ends toward each other for adjusting the size of the bearing to fit the shaft or journal upon which it is used. One of the lugs H is threaded to fit the screw, and I provide a jam nut K to secure the adjusting screw against rotation once it is adjusted.

Figure 1:
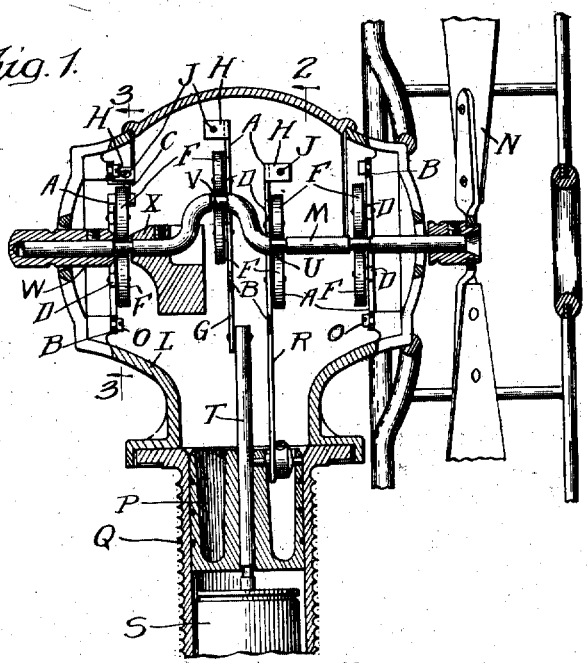
Figure 1 is a central vertical sectional view of a motor-driven fan equipped with roller bearings embodying my invention.
Figure 2:
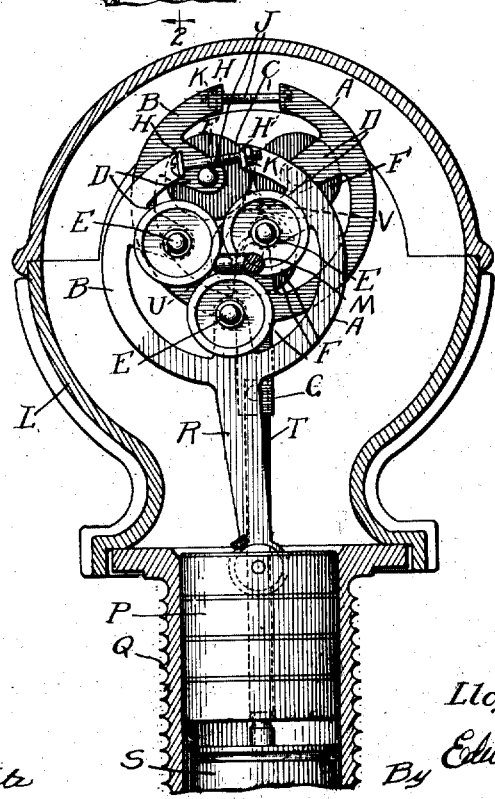
Fig. 2 is a transverse section substantially on the line 2—2 of Fig. 1.

Figs. 1 and 2 illustrate the application of my improved roller bearing to the construction of a motor driven fan.

The fan has a casing L at its upper end in which a shaft M is mounted carrying on one end the wing fan N. The shaft is supported in two of my bearings which are mounted rigidly in the casing, the ring of the bearing in each case being provided with two holes for receiving screws O for mounting the bearings, as best shown in Fig. 3.

The shaft is driven by a piston P mounted within a cylinder Q below the shaft, the piston being connected to one of my bearings by a long connecting rod R which is preferably formed integrally with the frame of the bearing. The shaft operates a displacer S which carries a piston rod T guided through the piston P and its upper end is pivotally connected to the free end of the short outer projection G of one of my improved bearings. Each of said bearings which are connected with the piston and the displacer are carried on suitable crank pins U and V respectively, formed on the shaft M.

One of the bearings, which is mounted in the casing, serves as a thrust bearing to hold the shaft against endwise displacement, the shaft being provided with suitable fixed collars W and X which are adapted to contact with the flat sides of the rollers F within the inner ends of the arms D.

In mounting my bearings upon a shaft, cranked or straight, the adjusting screws can be removed and the shaft can be passed through the opening in the ring and between two of the rollers F, the ring being capable of opening sufficiently for this purpose.

After the shaft is in place between the three rollers the ring is contracted by the adjusting screw thereby drawing two of the rollers toward each other and forcing the shaft toward the third or middle roller until the rollers are in proper running contact with the shaft journal, then the adjusting screw is locked by means of the lock nut.

The rollers being of such relatively large diameter the wear on their peripheries is practically nothing at all, but should it develop that there is a slight looseness between the rollers and the journal this can be easily taken out by means of the adjusting screw.

It should be noted by reference to Fig. 4 that whether the thrust is transmitted from the piston rod to the shaft or from the shaft to the connecting rod it is passed through one of the rollers F substantially radially or toward the pin upon which it is mounted and consequently the strain has the least tendency to distort the bearing.

In Figs. 6 and 7 I have shown a form of bearing in which the split ring is preserved but the frame instead of having a single inwardly extending projection for each roller is provided with pairs of parallel projections or arms Y between which the rollers F are mounted on shouldered pins Z which are rigidly mounted at their ends in the inner ends of said pairs of arms Y.

The first form of bearing described is preferred as it is somewhat cheaper to manufacture. The frames for all three forms of the preferred form of bearing can be made by a single punching operation and by means of a single pair of dies, it being only necessary to use different widths of sheet steel in making the three different forms, viz: the stationary bearing, the bearing with the short rigid arm, and the one with the long rigid arm.

As many modifications of my invention will readily suggest themselves to one skilled in the art I do not limit or confine my invention to the specific structures shown and described.

I claim as my invention:

1. A roller bearing comprising a resilient split ring, rigid radial arms extending inwardly from the ring, axially alined pins rigidly mounted on the inner ends of said arms, rollers rotatably mounted on said pins adapted to surround a journal bearing, and tension means for closing said ring for adjusting the relative positions of said rollers to cause them to properly contact with a journal.

2. A roller bearing comprising a one-piece resilient frame, in the form of a split ring, tension means connecting the ends of the ring for contracting same, a series of anti-friction rollers carried by said ring arranged concentrically around the axis thereof and adapted to receive a journal between their inner surfaces, two of said rollers being separable by the expansion of the ring to permit the bearing to be entered transversely upon a journal.

3. A three point roller bearing comprising a resilient ring split at one point in its circumference, tension means connecting the ends of the ring for contracting same, three anti-friction rollers carried by said ring at substantially equally circumferentially spaced points, said split in the ring being arranged between two of said rollers whereby the expansion and contraction of the ring separates said rollers and draws them closer together respectively.

4. A roller bearing comprising a flat sheet metal ring split at one point of its circumference, the ends of the ring being bent up at right angles to form oppositely disposed lugs, a screw connecting said lugs for closing said ring, anti-friction rollers carried by said ring equally spaced about the center thereof, and adapted to receive a journal between their inner edges, said rollers being adapted to be drawn together and separated by contraction and expansion of said ring.

5. A roller bearing comprising a flat sheet metal ring split at one point of its circumference, the ends of the ring being bent up at right angles to form oppositely disposed lugs, a screw connecting said lugs for closing said ring, anti-friction rollers carried by said ring equally spaced about the center thereof, and adapted to receive a journal between their inner edges, said rollers being adapted to be drawn together and separated by contraction and expansion of said ring, and means diametrically opposite to said split for connecting the bearing to an operating member.

In testimony whereof I have signed my name in presence of two subscribing witnesses.

LLOYD D. FREELAND.

Witnesses:
J. A. KJELDSON,
CHARLES WEST.

Copies of this patent may be obtained for five cents each, by addressing the "Commissioner of Patents, Washington, D. C."